L. E. TRUESDELL.
Car-Wheels.
No. 152,708. Patented June 30, 1874.
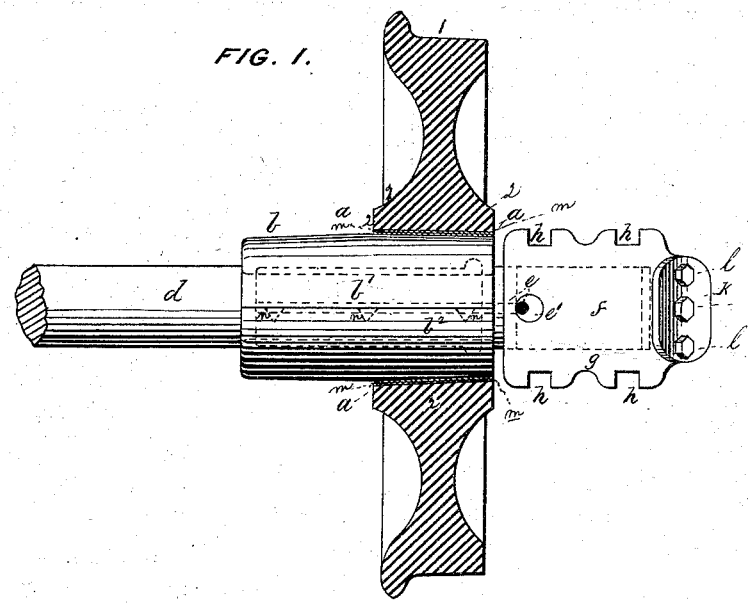
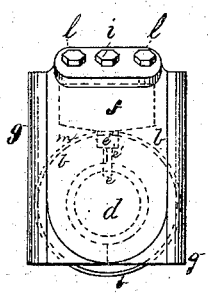
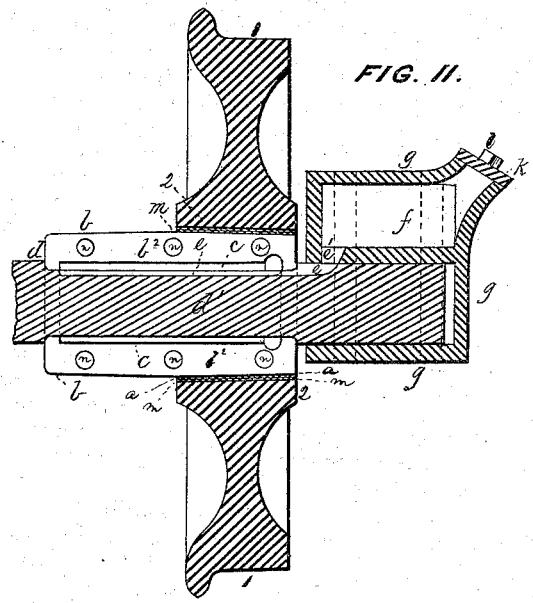
WITNESSES:
INVENTOR:

UNITED STATES PATENT OFFICE.

LUCIUS E. TRUESDELL, OF WARREN, MASSACHUSETTS.

IMPROVEMENT IN CAR-WHEELS.

Specification forming part of Letters Patent No. 152,708, dated June 30, 1874; application filed May 29, 1874.

*To all whom it may concern:*

Be it known that I, LUCIUS E. TRUESDELL, of Warren, in the county of Worcester and State of Massachusetts, have invented certain new and useful Improvements in Car-Wheels for Horse-Cars; and I do hereby declare that the following is a full, clear, and exact description thereof, which will enable others skilled in the art to which it pertains to make and use the same, reference being had to the accompanying drawings, and to the letters of reference marked thereon, which form a part of this specification, in which—

Figure 1 represents a partial horizontal section of a car wheel and axle having my improvements applied thereto, the axle being broken off; and Fig. 2, a vertical section of the same. Fig. 3 represents a front elevation of pedestal axle-box detached from the axle.

My invention relates to a new and improved mode of constructing and mounting a street-car wheel upon its axle, and belongs to that class in which the axle remains stationary, while the wheel turns on its spindle, as contra-distinguished from those in which the wheels and axle both revolve; and it consists in making the wheel and its hub in two separate and distinct parts, so that when the former wears out it may be replaced without the necessity of renewing the latter, and thus lessen the cost of renewal. To this end the wheel is provided with an enlarged opening through its nave or center for the reception of the auxiliary hub, and the latter provided on its inside with a recess for babbitt or other anti-friction metal or material, in order to form a suitable bearing for the axle-spindle. It also consists in combining with a rotating wheel and stationary axle, provided with a channel running the length, or nearly so, of the spindle, a combined pedestal-box and oil-chamber of peculiar construction, for the better lubricating of the journal and its bearing. And lastly, it consists in a new and improved mode of securing the wheel to its hub by the interposition of a thin strip of vulcanized rubber between them, by which a firm impact is secured between the hub and wheel.

To enable those skilled in the art to make, construct, and use my invention, I will now proceed to describe its parts in detail.

The body of the wheel may be made with a web connecting the tread 1 and the nave 2 together, or the two may be connected by iron spokes in the ordinary manner. The wheel in this respect differs in having a much larger opening, $a$, through its center, the object of which is to receive what may be termed a supplementary hub, $b$. Ordinarily, this hub $b$ will be made in two halves, $b^1$ and $b^2$; but, if desired, may be cast in one piece. In either event, it is provided on the inside with a recess, $c$, for the reception of babbitt or other anti-friction metal or material to form the bearings of the axle $d$. The spindle $d'$ of the axle is made slightly less in diameter where it rests in the bearings than the axle itself, and is provided with a longitudinal groove or channel, $e$, on its upper side, through which the oil or lubricating fluid passes from the oil-tank $f$ to the bearings, which run nearly, if not quite, the whole length of the line of the hub $b$. The axle $d$, like all other street-car axles, is prolonged beyond the outer side of the wheel, in order to form the bearing or support of the car body, to which end it is provided with a pedestal box, $g$, in the usual manner, by fitting it on the outer end of the axle $d$, as shown in Figs. 2 and 3. This box $g$, like others of its kind, is fitted with guide-grooves $h$ for the reception of the tongues formed on the sides of the jaws of the pedestal. In the upper part of the box $g$ is formed a chamber or reservoir, $f$, for holding the oil which lubricates the axle, for which purpose a small opening, $e'$, is made in the bottom of the box, and is so arranged as to communicate with the longitudinal channel $e$ cut in the face of the spindle $d'$ of the axle. The outer opening to this chamber $f$ is closed by a cover, $k$, which is secured to the box by screws $l$. A third screw-bolt, $i$, if desired, may be made to pass through the cap down to the box and into the end of the axle to keep the box in position on the axle, but this may be effected in any other well-known way, or entirely dispensed with, at pleasure, leaving the jaws of the pedestal to hold it in place. The screw-bolt $i$ also serves to hold the axle stationary during the rotation of the wheel by the clasping action of the pedestal-jaws on the pedestal box or block $g$; but this may be better effected by making the outer end of the axle of any form other than circular, and then making the socket in the pedestal-box into which it takes of corresponding shape—as, for instance, square, triangular, octagonal, &c.

The hub $b$ and spindle $d'$ of the axle are made considerably longer than the corresponding length of the nave 2 of the wheel, their prolongation being on the inner side of the wheel, which greatly strengthens the axle, reduces friction, and prevents breakage.

Where the hub $b$ is made in two parts the outer end of the axle may be of the same diameter as its main body, as shown in Fig. 2, as in that case the two parts $b^1$ and $b^2$ can be fitted around the spindle-part proper of the axle, and which, as before stated, is made of lesser diameter than the axle itself, as in Fig. 2; but where the hub $b$ is made in a single piece the outer ends of the axle must be made of a size not greater in diameter than the spindle portion $d'$ of the axle, for self-evident reasons.

In putting the wheel and axle together the hub $b$ is first placed on the spindle, and the wheel proper then forced over it by hydraulic or other power, and that either with or without the interposition of a thin sleeve, $m$, made of suitably-prepared rubber—preferably, vulcanized, and mixed with fibrous substances, so as to possess but little, if any, elastic properties. This sleeve need not of necessity form a section of a tube, but may consist of a simple strip of rubber of suitable length to encircle the hub, and of a width at least equal to the length of the opening in the nave 2 of the wheel. This mode of securing the wheel to the supplementary hub, by the interposition of the thin sleeve of rubber, I prefer to the alternative mode of securing them together by direct contact, and instead of forcing the wheel over the supplementary hub by hydraulic or other power it may be effected by expanding the wheel under heat, and in that condition slipping it over the hub $b$, and over the rubber-sleeve $m$ when such is used, and then shrinking the wheel around the hub, either by the immediate application of cold water, or by other well-known refrigerant means. When the hub $b$ is made in two parts, tongues and grooves $n$—the one on the one half, and the other on the other half—may be used to keep them in place while the wheel is being forced on or secured to the hub. Moreover, any suitable or well-known means may be used to keep the hub in place on the axle.

To facilitate this operation the outer end of the supplementary hub $b$ may be very slightly inclined, on the principle of the frustum of a cone, for a distance at least equal to the thickness of the nave 2 of the wheel—that is to say, small at its outer end, and gradually although very slightly increasing in thickness as it recedes toward its inner end. The opening in the nave 2 of the wheel is correspondingly shaped, but in the opposite direction—that is to say, the rear end of the opening in the nave is made slightly larger than its end on the outer side of the wheel.

The advantages of such a wheel are manifest, as, among others, when the tread has been worn out the main body of the wheel alone need be removed and a new one substituted, thus saving the auxiliary hub and bearing box, and thereby materially lessening the cost of the new wheel; while by making their point of junction at the nave sufficient frictional surface is obtained to insure a strong bond of union. Moreover, such construction facilitates the renewal of the babbitt-metal of the bearings when such becomes worn and necessary.

I am aware that lubricating-pedestals have been combined with stationary axles; but

What I claim is—

1. A supplementary hub, $b$, provided with a recess for the reception of anti-friction material, to form the bearings of the spindle of a stationary axle, in combination with a car-wheel, all constructed substantially as and for the purposes set forth.

2. The rubber sleeve $m$, in combination with a supplementary hub, $b$, and car-wheel, constructed in the manner and for the purpose set forth.

3. The combination of a stationary axle, $d$, and spindle $d'$, with a supplementary hub, $b$, provided with a recess for the reception of anti-friction material, and with a car-wheel, all constructed in the manner and for the purposes substantially as set forth.

4. The combination of the pedestal-box $g$, having a lubricating-chamber, $f$, and oil-passage $e'$, with a stationary axle having a channel, $e$, as set forth.

In testimony that I claim the foregoing as my own, I affix my signature in presence of two witnesses.

LUCIUS E. TRUESDELL.

Witnesses:
D. G. STUART,
I. Y. KNIGHT.